US006835762B1

(12) United States Patent
Kelmarczyk et al.

(10) Patent No.: US 6,835,762 B1
(45) Date of Patent: Dec. 28, 2004

(54) CURE ACCELERATORS FOR ANAEROBIC CURABLE COMPOSITIONS

(75) Inventors: Philp T. Kelmarczyk, Canton, CT (US); Karen R. Brantl, West Springfield, MA (US)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 10/157,812

(22) Filed: May 31, 2002

(51) Int. Cl.$^7$ .................................................. C09J 4/00
(52) U.S. Cl. ........................ 523/176; 524/252; 524/247; 524/257; 526/219.1; 526/219.2; 526/230; 526/218.1; 526/320; 526/321; 526/328; 156/331.1; 156/332
(58) Field of Search ................... 523/176; 524/252, 524/247, 257; 526/219.1, 219.2, 230, 218.1, 320, 321, 328; 156/331.1, 332

(56) References Cited

U.S. PATENT DOCUMENTS

| 3,218,305 | A | | 11/1965 | Krieble ........................ 260/89.5 |
|---|---|---|---|---|
| 3,970,505 | A | | 7/1976 | Hauser et al. ............... 156/331 |
| 4,180,640 | A | | 12/1979 | Melody et al. ........... 526/323.1 |
| 4,287,330 | A | | 9/1981 | Rich ........................... 526/270 |
| 4,321,349 | A | | 3/1982 | Rich ........................... 526/270 |
| 4,764,239 | A | | 8/1988 | Jacobine et al. ......... 156/307.3 |
| 5,021,487 | A | * | 6/1991 | Klemarczyk ................ 524/104 |
| 5,411,988 | A | | 5/1995 | Bockow et al. ............. 514/560 |
| 5,811,473 | A | | 9/1998 | Ramos et al. ................ 523/176 |

FOREIGN PATENT DOCUMENTS

| DE | 1 817 989 | 9/1976 | ............... C09J/5/00 |
|---|---|---|---|
| DE | 2 806 701 | 1/1993 | ........... C08L/33/08 |
| JP | 07-308757 | 9/1969 | |
| JP | 05-105847 | 6/1991 | |
| WO | WO 99/01484 | 1/1999 | ........... C08F/26/06 |
| WO | WO 00/40664 | 7/2000 | ............... C09J/4/00 |

OTHER PUBLICATIONS

R.D. Rich, "Anaerobic Adhesives" in *Handbook of Adhesive Technology*, 29, 467–79.
A. Pizzi and K.L. Mittal, eds., Marcel Dekker, Inc., New York (1994).

* cited by examiner

*Primary Examiner*—Tatyana Zalukaeva
(74) *Attorney, Agent, or Firm*—Steven C. Bauman (57) ABSTRACT

The present invention provides a new class of materials effective as cure accelerators for anaerobic curable compositions. The addition of these materials into anaerobic adhesives as a replacement for conventional curatives, such as acetyl phenyl hydrazine and maleic acid or toluidines, surprisingly provides at least comparable cure speeds and physcial properties for the reaction products formed therefrom.

17 Claims, 5 Drawing Sheets

III, Z = C=C, R = H, CAPH
IV, Z = C=C, R = CH₃, MCAPH
V, Z = C-C, R = H, CPPH

VI, MCPPH

FIG. 10

CURE ACCELERATORS FOR ANAEROBIC CURABLE COMPOSITIONS

BACKGROUND OF THE INVENTION

1. Field of the Invention

The present invention relates to new cure accelerators for anaerobic curable compositions. The compositions are particularly useful as adhesives and sealants.

2. Brief Description of Related Technology

Anaerobic adhesive compositions generally are well-known. See e.g., R. D. Rich, "Anaerobic Adhesives" in *Handbook of Adhesive Technology*, 29, 467–79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Desirable anaerobic cure-inducing compositions to induce and accelerate cure may include saccharin, toluidines, such as N,N-diethyl-p-toluidine ("DE-p-T") and N,N-dimethyl-o-toluidine ("DM-o-T"), acetyl phenylhydrazine ("APH"), maleic acid, and quinones, such as naphthaquinone and anthraquinone. See e.g., Loctite U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

Saccharin and acetylphenyl hydrazine ("APH") have been used as standard cure accelerator components in anaerobic adhesive cure systems since the inception of the technology. Loctite currently uses either saccharin alone or both saccharin and APH in most of its anaerobic adhesives.

Other curatives for anaerobic adhesives include thiocaprolactam (e.g., U.S. Pat. No. 5,411,988) and thioureas [e.g., U.S. Pat. No. 3,970,505 (Hauser) (tetramethyl thiourea), German Patent Document Nos. DE 1 817 989 (alkyl thioureas and N,N'-dicyclohexyl thiourea) and 2 806 701 (ethylene thiourea), and Japanese Patent Document No. JP 07-308,757 (acyl, alkyl, alkylidene, alkylene and alkyl thioureas)], certain of the latter of which had been used commercially up until about twenty years ago.

Recently, Loctite Corporation has discovered a new class of materials—trithiadiaza pentalenes—effective as curatives for anaerobic adhesive compositions. The addition of these materials into anaerobic adhesives as a replacement for conventional curatives (such as APH) surprisingly provides at least comparable cure speeds and physical properties for the reaction products formed therefrom. (See International Patent Publication No. WO00/40664.)

In a UV curable anaerobic adhesive system, ThreeBond Co. Ltd. appears to have disclosed the use of the combination of 1-(2-carboxyacryloyl)-2-phenylhydrazine and o-benzoic sulfimide. See Japanese Patent Document No. JP 05-105,847.

Nonetheless, there is an on-going desire to find alternative technologies for anaerobic cure accelerators to differentiate existing products and provide supply assurances in the event of shortages or cessation of supply of raw materials. Accordingly, it would be desirable to identify new materials which function as accelerators in the cure of anaerobic curable compositions.

SUMMARY OF THE INVENTION

The present invention provides new cure accelerators for anaerobic curable compositions. The cure accelerators include the —C(=O)—NH—NH— linkage, together with an organic acid functional group on the same molecule. For instance, the inventive cure accelerators may be within structures I or II where $R^1$, $R^2$ and $R^3$ in structure I and $R^1$, $R^2$, $R^3$, $R^4$, $R^5$, $R^6$ and $R^7$ in structure II are each independently selected from hydrogen or $C_{1-4}$; Z is a carbon-carbon single bond or carbon-carbon double bond; q is 0 or 1; and p is an integer between 1 and 5.

The addition of these materials into anaerobic curable compositions as a replacement for some or all of the amount of conventional anaerobic cure accelerators (such as APH or the toluidines noted above) surprisingly provides at least comparable cure speeds and physical properties for the reaction products formed therefrom. It is desirable that the anaerobic cure accelerators excludes 1-(2-carboxyacryloyl)-2-phenylhydrazine. It is alternatively or additionally desirable that the composition is not rendered UV curable by the addition of a UV photoinitiator.

This invention also provides anaerobic curable compositions prepared with such cure accelerators, methods of preparing and using the inventive anaerobic cure accelerators as well as reaction products of the inventive anaerobic curable compositions.

The present invention will be more fully appreciated by a reading of the "Detailed Description of the Invention", and the illustrative examples which follow thereafter.

DETAILED DESCRIPTION OF THE INVENTION

The present invention provides anaerobic cure accelerators, having the linkage —C(=O)—NH—NH— and an organic acid group on the same molecule. The addition of such compounds as cure accelerators into anaerobic adhesives as a replacement for some or all of the amount of conventional cure accelerators surprisingly provides at least comparable cure speeds and physical properties for the reaction products formed.

The inventive anaerobic cure accelerators may be represented below within structures I and II:

I

II where $R^1$ through $R^7$, are each independently selected from hydrogen or $C_{1-4}$; Z is a carbon-carbon single bond or carbon-carbon double bond; q is 0 or 1; and p is an integer between 1 and 5.

A more specific structure within structure II is structure IIa, represented below:

IIa where $R^1$, $R^2$ and $R^4$ are as defined above, as are Z and p.

Particular examples of such accelerators within structures I or II include:

III

IV

V

VI

The inventive anaerobic cure accelerators may be prepared generally from phenyl hydrazines and anhydrides within the following structure:

where $R^2$ through $R^7$ and q are as defined above. A more detailed description of the synthesis is set forth below in the examples.

Anaerobic curable compositions generally are based on a (meth)acrylate component, together with an anaerobic cure-inducing composition. In the present invention, the anaerobic curable composition is based on the (meth)acrylate component, together with an anaerobic cure-inducing composition which has at least reduced levels of APH (such as about 50% or less by weight of that which is used in conventional anaerobic curable compositions), and is desirably substantially free of APH. In place of some or all of APH is the inventive cure accelerator with the —C(=O)—NH—NH— linkage and the organic acid group on the same molecule, such as those within structures I and II, and more specifically compounds III, IV, V and VI. It is desirable that the anaerobic cure accelerators excludes 1-(2-carboxyacryloyl)-2-phenylhydrazine. It is alternatively or additionally desirable that the composition is not rendered UV curable by the addition of a UV photoinitiator.

(Meth)acrylate monomers suitable for use as the (meth) acrylate component in the present invention may be chosen from a wide variety of materials, such as these represented by $H_2C=CGCO_2R^8$, where G may be hydrogen, halogen or alkyl groups having from 1 to about 4 carbon atoms, and $R^8$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbonate, amine, amide, sulfur, sulfonate, sulfone and the like.

Additional (meth)acrylate monomers suitable for use herein include polyfunctional (meth)acrylate monomers, such as di-or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylates ("TMPTMA"), diethylene glycol dimethacrylate, triethylene glycol dimethacrylates ("TRIEGMA"), tetraethylene glycol di(meth)acrylates, dipropylene glycol di(meth)acrylates, di-(pentamethylene glycol) di(meth)acrylates, tetraethylene diglycol di(meth) acrylates, diglycerol tetra(meth)acrylates, tetramethylene di(meth)acrylates, ethylene di(meth)acrylates, neopentyl glycol di(meth)acrylates, and bisphenol-A mono and di(meth)acrylates, such as ethoxylated bisphenol-A (meth) acrylate ("EBIPMA"), and bisphenol-F mono and di(meth) acrylates, such as ethoxylated bisphenol-A (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 90 percent by weight of the composition, such as about 60 to about 90 percent by weight, based on the total weight of the composition.

Recently, additional components have been included in traditional anaerobic adhesives to alter the physical properties of either the formulation or the reaction products thereof.

For instance, one or more of maleimide components, thermal resistance-conferring coreactants, diluent components reactive at elevated temperature conditions, mono- or poly-hydroxyalkanes, polymeric plasticizers, and chelators (see International Patent Application No. PCT/US98/13704, the disclosure of which is hereby expressly incorporated herein by reference) may be included to modify the physical property and/or cure profile of the formulation and/or the strength or temperature resistance of the cured adhesive.

When used, the maleimide, coreactant, reactive diluent, plasticizer, and/or mono- or poly-hydroxyalkanes, may be present in an amount within the range of about 1 percent to about 30 percent by weight, based on the total weight of the composition.

The inventive compositions may also include other conventional components, such as free radical initiators, free radical co-accelerators, and inhibitors of free radical generation, as well as metal catalysts.

A number of well-known initiators of free radical polymerization are typically incorporated into the inventive compositions including, without limitation, hydroperoxides, such as cumene hydroperoxide ("CHP"), para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl) benzene, diacetyl peroxide, butyl 4,4-bis(t-butylperoxy) valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

Such peroxide compounds are typically employed in the present invention in the range of from about 0.1 to about 10 percent by weight, based on the total weight of the composition, with about 1 to about 5 percent by weight being desirable.

As noted, conventional accelerators of free radical polymerization may also be used in conjunction with the inventive anaerobic cure accelerators, though in amounts less than that used in the past. Such accelerators are typically of the hydrazine variety (e.g., APH), as disclosed in U.S. Pat. No. 4,287,350 (Rich) and U.S. Pat. No. 4,321,349 (Rich). Maleic acid is usually added to APH-containing anaerobic cure systems. One benefit of the present invention is that the inventive anaerobic cure accelerators render the use of such acids unnecessary in preparing anaerobic adhesive compositions.

Co-accelerators of free radical polymerization may also be used in the compositions of the present invention including, without limitation, organic amides and imides, such as benzoic sulfimide (also known as saccharin). (See the '330 and '349 patents.)

Stabilizers and inhibitors (such as phenols including hydroquinone and quinones) may also be employed to control and prevent premature peroxide decomposition and polymerization of the composition of the present invention, as well as chelating agents [such as the tetrasodium salt of ethylenediamine tetraacetic acid ("EDTA")] to trap trace amounts of metal contaminants therefrom. When used, chelating agents may ordinarily be present in the compositions in an amount from about 0.001 percent by weight to about 0.1 percent by weight, based on the total weight of the composition.

The inventive anaerobic cure accelerators may be used in amounts of about 0.1 to about 5 percent by weight, such as about 1 to about 2 percent by weight, based on the total weight of the composition. When used in combination with conventional accelerators (though at lower levels than such conventional accelerators), the inventive accelerators should be used in amounts of 0.01 to 5 percent by weight, such as 0.02 to 2 percent by weight, based on the total weight of the composition.

Metal catalyst solutions or pre-mixes thereof are used in amounts of about 0.03 to about 0.1 percent by weight.

Other additives such as thickeners, non-reactive plasticizers, fillers, toughening agents (such as elastomers and rubbers) and other well-known additives may be incorporated therein where the art-skilled believes it would be desirable to do so.

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, and other metals and alloys, ceramics and thermosets. The compositions of this invention demonstrate particularly good bond strength on steel, brass, copper and zinc. An appropriate primer for anaerobic curable compositions may be applied to a surface of the chosen substrate to enhance cure rate. Or, the inventive anaerobic cure accelerators may be applied to the surface of a substate as a primer. See e.g. U.S. Pat. No. 5,811,473 (Ramos).

In addition, the invention provides a method of preparing an anaerobic curable composition, a step of which includes mixing together a (meth)acrylate component, an anaerobic cure inducing composition substantially free of acetyl phenyl hydrazine and optionally substantially free of maleic acid, and an anaerobic cure accelerator compound, having the linkage —C(=O)—NH—NH— and an organic acid group on the same molecule.

The invention also provides a process for preparing a reaction product from the anaerobic curable composition of the present invention, the steps of which include applying the composition to a desired substrate surface and exposing the composition to an anaerobic environment for a time sufficient to cure the composition.

This invention also provides a method of using as a cure accelerator for anaerobic curable composition, compounds having the linkage —C(=O)—NH—NH— and an organic acid group on the same molecule.

And the present invention provides a method of using an anaerobic cure accelerator compound, including (I) mixing the anaerobic cure accelerator compound in an anaerobic curable composition or (II) applying onto a surface of a substrate the anaerobic cure accelerator compound and applying thereover an anaerobic curable composition. Of course, the present invention also provides a bond formed between mated substartes with the inventive composition.

In view of the above description of the present invention, it is clear that a wide range of practical opportunities is provided. The following examples are provided for illustrative purposes only, and are not to be construed so as to limit in any way the teaching herein.

EXAMPLES

An investigation was performed to evaluate certain substituted 3-carboxyacryloyl phenylhydrazines, as replacements for APH in anaerobic curable compositions, particularly adhesives.

These new cure systems were compared with control formulations containing the conventional cure components, APH and saccharin by 82° C. accelerated stability, fixture time, and one hour/24 hour adhesion tests on nut/bolt specimens.

In addition, APH, a standard component in some anaerobic adhesive cure systems, is often used with toluidines, together with an acid, for enhanced performance. Four 3-carboxyacryloyl phenylhydrazines—III, IV, V and VI—were prepared and evaluated to determine whether inclusion thereof would obviate the use of a separate acid component in the anaerobic adhesives.

Figure 10:
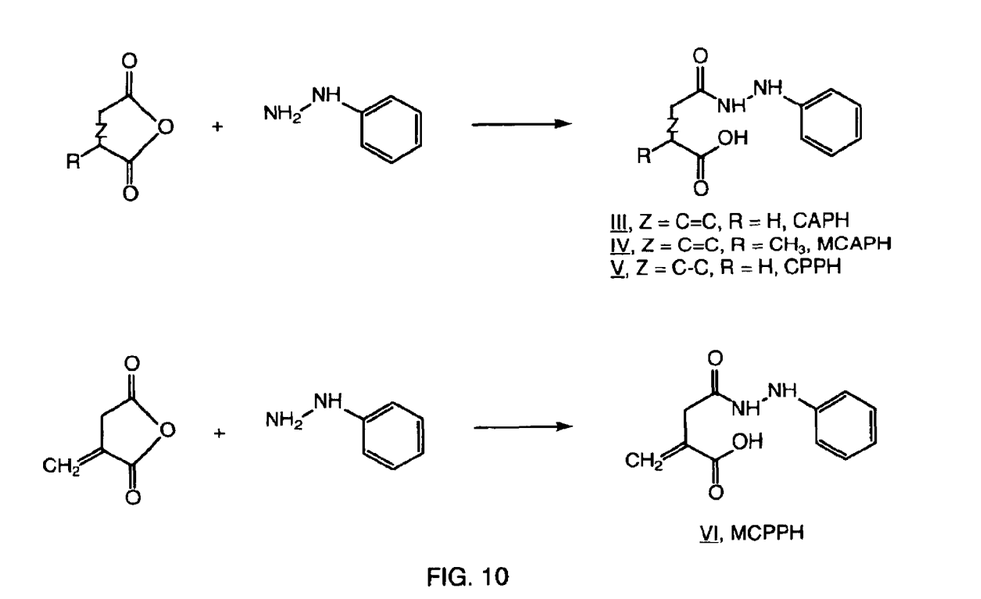
FIG. 10 depicts a synthetic scheme to prepare the inventive cure accelerators.

The inventive anaerobic cure accelerators were prepared in accordance with the synthetic scheme depicted in FIG. 10, and as described below.

Itaconic anhydride, maleic anhydride, phenyl hydrazine, TRIEGMA, TMPTMA, MA, saccharin, DE-p-T, DM-o-T, CHP, and APH were purchased from the Aldrich Chemical Company.

Proton Nuclear Magnetic Resonance ("$^1$H NMR") analyses were performed using a Varian 300 Hz Gemini Spectrophotometer. Infrared ("IR") spectral analyses were performed on neat samples using an ATI Mattson Genesis series FTIR. Melting points were obtained on a TA Instrument 2920 Differential Scanning Calorimeter.

A. General Procedure for the Synthesis of 3-Carboxyacrylayl Phenylhydrazines

To a 500 mL reaction flask, equipped with a nitrogen inlet, mechanical stirrrer, temperature controller, and an addition funnel, was added the anhydride (100 mmol) in toluene (150 mL). The reaction mixture was cooled to a temperature of about 0° C. in an ice bath and a solution of phenyl hydrazine (10.8 g, 100 mmol) in toluene (150 mL) was added slowly over a period of time of about 1–2 hours, maintaining the temperature between 0 and 5° C. with the ice bath. The reaction was allowed to warm to ambient temperature, while stirring continued for a period of time of about 12–24 hours. The desired product precipitated from the reaction mixture, was collected by filtration and the filtrate was washed thoroughly with fresh toluene until the rinse solvent was colorless.

CAPH, III—Yield=3.14 g (31%); M.P. (DSC)=130–133° C.; $^1$H NMR (CDCl$_3$) δ 7.9 (br s, 3, OH, NH), 7.1 (m, 2, Ar—H), 6.7 (m, 3, Ar—H), 6.4 (dd, 2, C=C—H); IR (KBr) 3259, 1701, 1604, 1543 cm$^{-1}$.

MCAPH, IV—Yield=3.3 g (30%); M.P. (DSC)=160–162° C.; $^1$H NMR (CDCl$_3$) δ 8.3 (br s, 3, OH, NH), 7.1 (m, 2, Ar—H), 6.7 (m, 2, C=C—H, Ar—H), 2.1 (s, 3, CH$_3$); IR (KBr) 3286, 1701, 1605, 1498 cm$^{-1}$.

CPPH, V—Yield=6.6 g (65%); M.P. (DSC)=144° C.; $^1$H NMR (CDCl$_3$) δ 12.1 (br s, 1, OH), 9.6 (br s, 1, NH), 7.6 (br s, 1, NH), 7.1 (m, 2, Ar—H), 6.7 (m, 3, Ar—H), 3.3 (s, 2, CH$_2$), 2.4 (m, 2, CH$_2$); IR (KBr) 3295, 3040, 1705, 1667, 1640, 1605, 1496, 1239, 748 cm$^{-1}$.

MCPPH, VI—Yield=9.5 g (87%); M.P. (DSC)=118° C.; $^1$H NMR (CDCl$_3$) δ 12.1 (br s, 1, OH), 9.6 (br s, 1, NH), 7.6 (br s, 1, NH), 7.1 (m, 2, Ar—H), 6.7 (m, 3, Ar—H), 6.1 (s, 2, =CH$_2$), 5.7 (m, 2, =CH$_2$), 3.3 (m, 2, CH$_2$); IR (KBr) 3238, 3059, 1727, 1647, 1605, 1498, 1174, 761 cm$^{-1}$.

B. Adhesive Formulations with 3-Carboxyacryloyl Phenylhydrazines

Sample Nos. 1–36 were prepared from the noted components in the listed amounts, by mixing with a mechanical stirrer in glass vials. Each sample included a chelator and naphthaquinone as stabilizers. The control samples with and without DE-p-T/DM-o-T are shown in Table 1; for 3-carboxyacryloyl phenylhydrazine ("CAPH"), III, are shown in Table 2; for methyl-3-carboxyacryloyl phenylhydrazine ("MCAPH"), IV, are shown in Table 3; for 3-carboxypropanoyl phenylhydrazine ("CPPH"), V, are shown in Table 4; and for methylene-3-carboxypropanoyl phenylhydrazine ("MCPPH"), VI, are shown in Table 5.

TABLE 1

Formulations for the Controls

| COMPONENTS | | Sample No./Amt. (phr) | | | |
|---|---|---|---|---|---|
| Type | Identity | 1 | 2 | 3 | 4 |
| (Meth)acrylate | TRIEGMA | 50 | 50 | 50 | 50 |
| | TMPTMA | 50 | 50 | 50 | 50 |
| Conventional Co-Accelerator | Saccharin | 1 | 1 | 1 | 1 |
| Conventional Accelerator | APH | 1.00 | 1.00 | 0.40 | 0.40 |
| Toluidines | DE-p-T | — | — | 0.70 | 0.70 |
| | DM-o-T | — | — | 0.35 | 0.35 |
| Peroxide | CHP | 1 | 1 | 1 | 1 |
| Acid | Maleic | — | — | 1 | 1 |
| | (Meth)acrylic | — | 5 | — | 5 |

TABLE 2

Anaerobic Formulations with CAPH

| COMPONENTS | | Sample No./Amt. (phr) | | | | | | | |
|---|---|---|---|---|---|---|---|---|---|
| Type | Identity | 5 | 6 | 7 | 8 | 9 | 10 | 11 | 12 |
| (Meth)acrylate | TRIEGMA | 50 | 50 | 50 | 50 | 50 | 50 | 50 | 50 |
| | TMPTMA | 50 | 50 | 50 | 50 | 50 | 50 | 50 | 50 |
| Conventional Co-Accelerator | Saccharin | 1 | 1 | 1 | 1 | 1 | 1 | 1 | 1 |
| Inventive Accelerator | CAPH | 0.69 | 0.69 | 1.03 | 1.03 | 1.37 | 1.37 | 0.55 | 0.55 |
| Toluidines | DE-p-T | — | — | — | — | — | — | 0.70 | 0.70 |
| | DM-o-T | — | — | — | — | — | — | 0.35 | 0.35 |
| Peroxide | CHP | 1 | 1 | 1 | 1 | 1 | 1 | 1 | 1 |
| Acid | Maleic | — | — | — | — | — | — | 1 | 1 |
| | (Meth)acrylic | — | 5 | — | 5 | — | 5 | — | 5 |

TABLE 3

Anaerobic Formulations with MCAPH

| COMPONENTS | | Sample No./Amt. (phr) | | | | | | | |
|---|---|---|---|---|---|---|---|---|---|
| Type | Identity | 13 | 14 | 15 | 16 | 17 | 18 | 19 | 20 |
| (Meth)acrylate | TRIEGMA | 50 | 50 | 50 | 50 | 50 | 50 | 50 | 50 |
| | TMPTMA | 50 | 50 | 50 | 50 | 50 | 50 | 50 | 50 |
| Conventional Co-Accelerator | Saccharin | 1 | 1 | 1 | 1 | 1 | 1 | 1 | 1 |
| Inventive Accelerator | MCAPH | 0.73 | 0.73 | 1.10 | 1.10 | 1.47 | 1.47 | 0.60 | 0.60 |
| Toluidines | DE-p-T | — | — | — | — | — | — | 0.70 | 0.70 |
| | DM-o-T | — | — | — | — | — | — | 0.35 | 0.35 |
| Peroxide | CHP | 1 | 1 | 1 | 1 | 1 | 1 | 1 | 1 |
| Acid | Maleic | — | — | — | — | — | — | 1 | 1 |
| | (Meth)acrylic | — | 5 | — | 5 | — | 5 | — | 5 |

TABLE 4

Anaerobic Formulations with CPPH

| COMPONENTS | | Sample No./Amt. (phr) | | | | | | | |
|---|---|---|---|---|---|---|---|---|---|
| Type | Identity | 21 | 22 | 23 | 24 | 25 | 26 | 27 | 28 |
| (Meth)acrylate | TRIEGMA | 50 | 50 | 50 | 50 | 50 | 50 | 50 | 50 |
| | TMPTMA | 50 | 50 | 50 | 50 | 50 | 50 | 50 | 50 |
| Conventional Co-Accelerator | Saccharin | 1 | 1 | 1 | 1 | 1 | 1 | 1 | 1 |
| Inventive Accelerator | CPPH | 0.70 | 0.70 | 1.04 | 1.04 | 1.38 | 1.38 | 0.56 | 0.56 |
| Toluidines | DE-p-T | — | — | — | — | — | — | 0.70 | 0.70 |
| | DM-o-T | — | — | — | — | — | — | 0.35 | 0.35 |
| Peroxide | CHP | 1 | 1 | 1 | 1 | 1 | 1 | 1 | 1 |
| Acid | Maleic | — | — | — | — | — | — | 1 | 1 |
| | (Meth)acrylic | — | 5 | — | 5 | — | 5 | — | 5 |

TABLE 5

Anaerobic Formulations with MCPPH

| COMPONENTS | | Sample No./Amt. (phr) | | | | | | | |
|---|---|---|---|---|---|---|---|---|---|
| Type | Identity | 29 | 30 | 31 | 32 | 33 | 34 | 35 | 36 |
| (Meth)acrylate | TRIEGMA | 50 | 50 | 50 | 50 | 50 | 50 | 50 | 50 |
| | TMPTMA | 50 | 50 | 50 | 50 | 50 | 50 | 50 | 50 |
| Conventional Co-Accelerator | Saccharin | 1 | 1 | 1 | 1 | 1 | 1 | 1 | 1 |
| Inventive Accelerator | MCPPH | 0.73 | 0.73 | 1.10 | 1.10 | 1.47 | 1.47 | 0.60 | 0.60 |

TABLE 5-continued

Anaerobic Formulations with MCPPH

| COMPONENTS | | Sample No./Amt. (phr) | | | | | | | |
|---|---|---|---|---|---|---|---|---|---|
| Type | Identity | 29 | 30 | 31 | 32 | 33 | 34 | 35 | 36 |
| Toluidines | DE-p-T | — | — | — | — | — | — | 0.70 | 0.70 |
|  | DM-o-T | — | — | — | — | — | — | 0.35 | 0.35 |
| Peroxide | CHP | 1 | 1 | 1 | 1 | 1 | 1 | 1 | 1 |
| Acid | Maleic | — | — | — | — | — | — | 1 | 1 |
|  | (Meth)acrylic | — | 5 | — | 5 | — | 5 | — | 5 |

C. Physical Properties

Shelf Life Stability

The 82° C. stability of the formulations was determined according to an evaluation in which the formulation is judged to have acceptable shelf stability if the adhesive formulation remains liquid for 3.5 hours or longer at 82° C.

The majority of the various formulations demonstrated acceptable shelf life stability. The only exception was the formulation with an equimolar amount of CAPH, III, as compared to APH, in the formulation without DE-p-T/DM-o-T, which polymerized shortly after mixing was complete.

Fixture Times

Steel 3/8×16 nuts and bolts were degreased with 1,1,1 trichloroethylene, adhesive was applied to the bolt, and the nut was screwed onto the bolt with a steel collar as a spacer.

Five nut and bolt specimens were assembled for each adhesive. The time required for the adhesive to cure sufficiently to enable the assembled specimen to resist loosening by finger turning was then recorded. The average fixture time of the five specimens was calculated as the fixture time for that adhesive.

Figure 1:
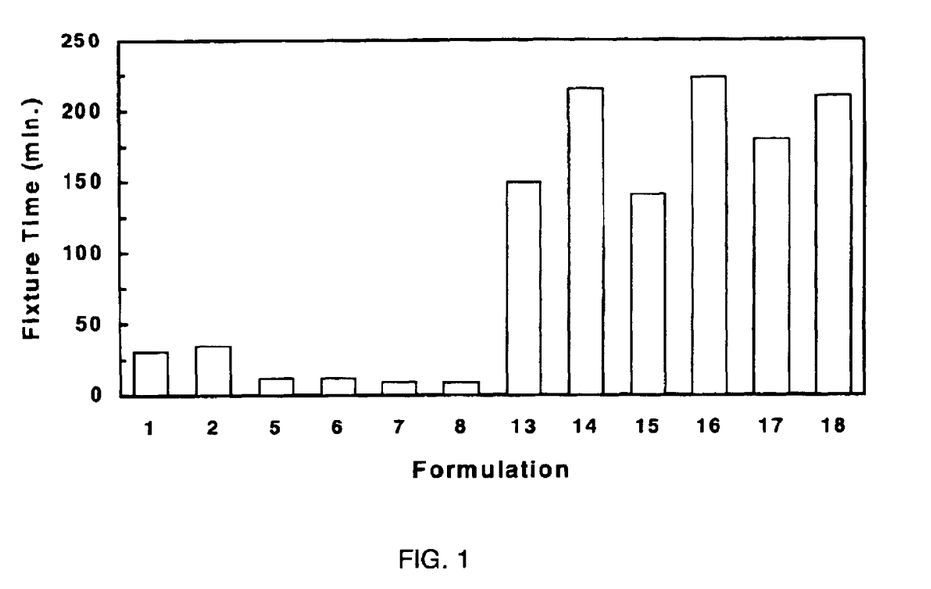
FIG. 1 depicts a bar chart of fixture times of APH based formulations containing CAPH, III, and MCAPH, IV, with and without methacrylic acid.
Figure 2:
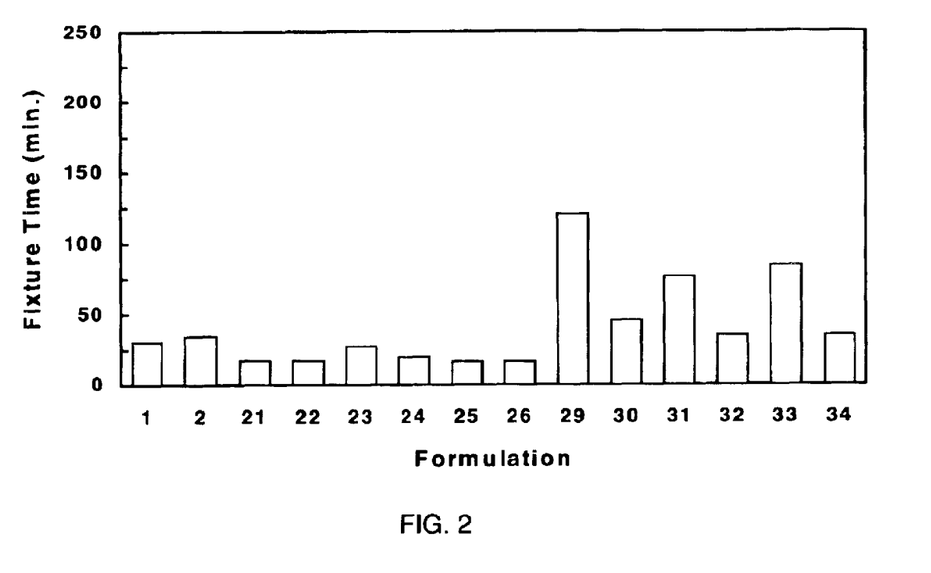
FIG. 2 depicts a bar chart of fixture times of APH based formulations containing CPPH, V, and MCPPH, VI, with and without methacrylic acid.
Figure 7:
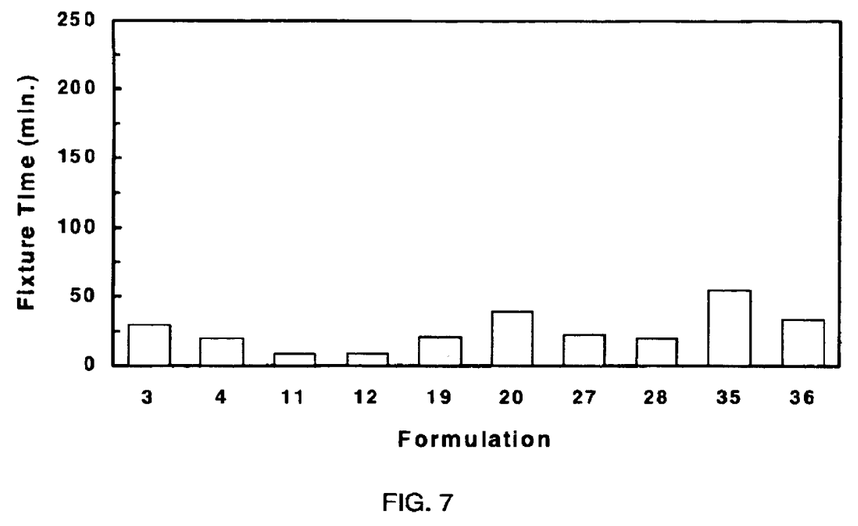
FIG. 7 depicts a bar chart of fixture times of DE-p-T/DM-o-T formulations of APH based formulations containing CAPH, III, and MCAPH, IV, with and without methacrylic acid.

Fixture times of the samples, with and without DE-p-T/DM-o-T, were then investigated, and are set forth in Tables 1–5 on steel nut/bolt specimens are depicted in FIGS. 1, 2 and 7.

One-Hour and 24-Hour Break and Prevail Strengths

For the break/prevail adhesion tests, the specimens were maintained at ambient temperature for 1 hour and 24 hours after assembly and were tested as follows.

Ten nut and bolt specimens were assembled in the same manner as for the fixture time test for each adhesive formulation. The break and prevail torque strengths were then recorded for half of the specimens after one hour at ambient temperature and after 24 hours at ambient temperature for the remaining specimens. The torque strengths were measured on a calibrated automatic torque analyzer.

The data for these evaluations is set forth below in Tables 6a–6c.

Figure 3:
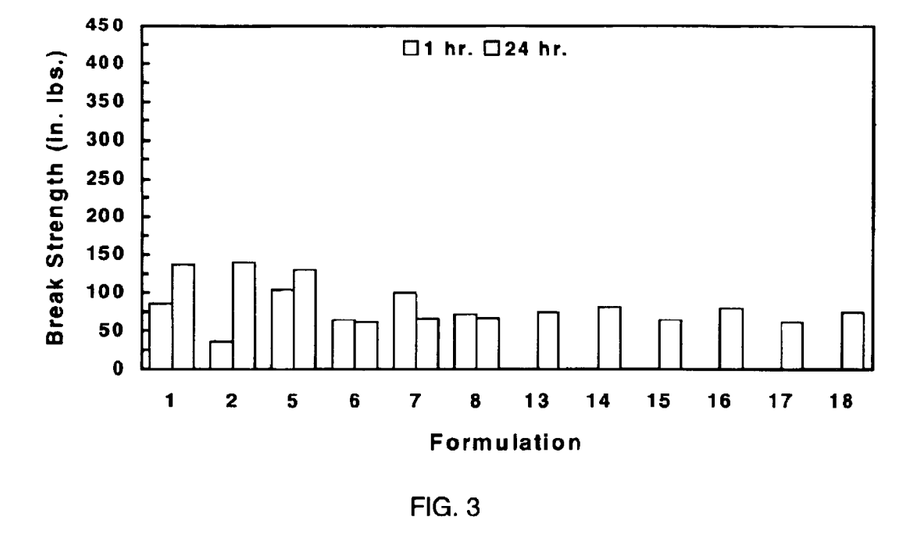
FIG. 3 depicts a bar chart of one-hour and 24 hour break strengths of CAPH, III, MCAPH, IV, and APH control, with and without methacrylic acid. The one hour break strengths were observed to be zero for Sample Nos. 13–18.
Figure 4:
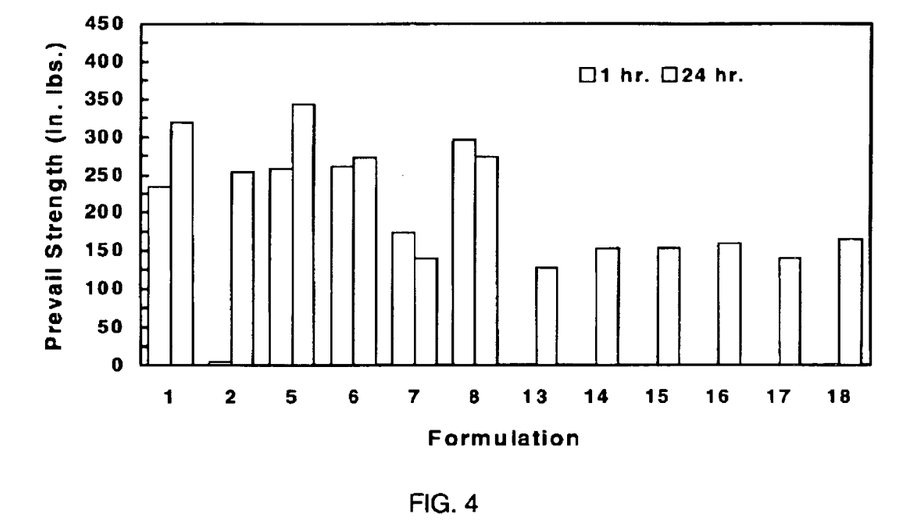
FIG. 4 depicts a bar chart of one-hour and 24 hour prevail strengths of CAPH, III, MCAPH, IV, and APH control, with and without methacrylic acid. The one hour prevail strengths were observed to be zero for Sample Nos. 13–18.

The strength data obtained from the formulations with CAPH and MCAPH, which uses the APH alone in the cure system as a control, are shown in FIGS. 3 and 4. Again, CAPH could not be evaluated at an equimolar concentration to saccharin, because the formulation was too reactive, so it was evaluated at one-half and three-quarters of the molar saccharin concentration. MCAPH was evaluated at equimolar, one-half, and three-quarters of the saccharin concentration.

Figure 5:
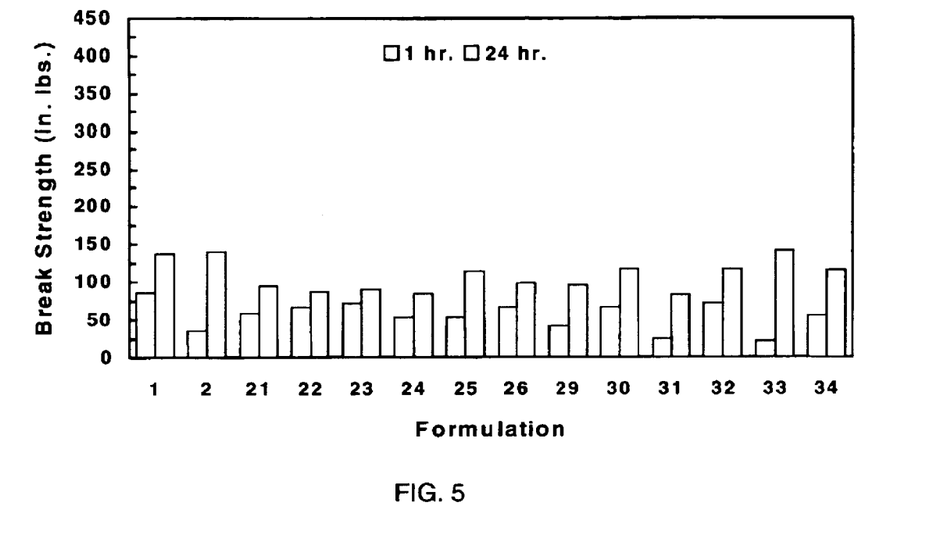
FIG. 5 depicts a bar chart of one-hour and 24 hour break strengths of CPPH, V, MCPPH, VI, and APH control, with and without methacrylic acid.
Figure 6:
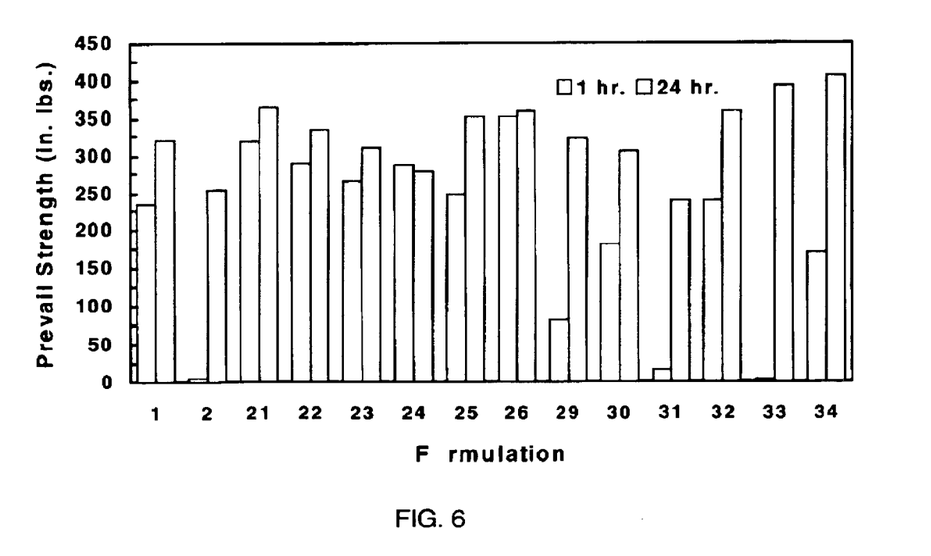
FIG. 6 depicts a bar chart of one-hour and 24 hour prevail strengths of CPPH, V, MCPPH, VI, and APH control, with and without methacrylic acid.

The results obtained from the formulations with DM-o-T/DE-p-T and CAPH or MCAPH with APH as a control, are depicted in FIGS. 5 and 6.

Figure 8:
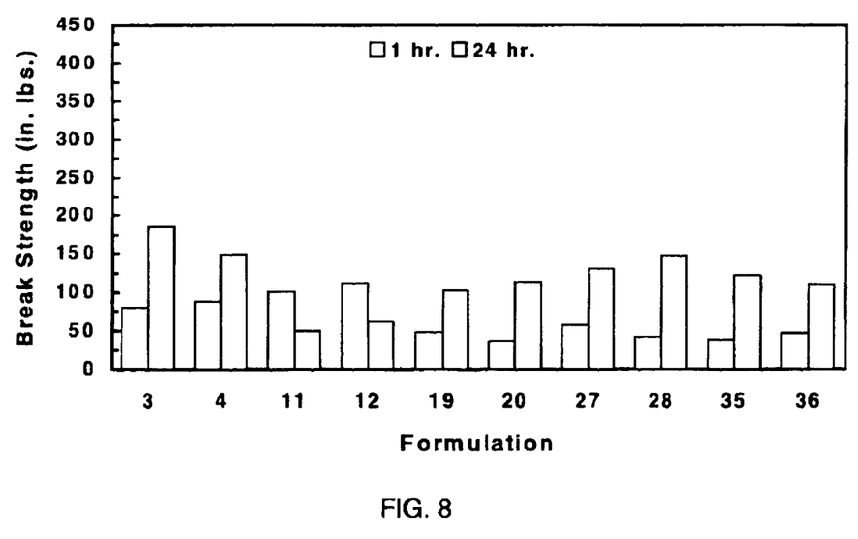
FIG. 8 depicts a bar chart of one-hour and 24 hour break strengths of DE-p-T/DM-o-T formulations of APH based formulations containing CAPH, III, MCAPH, IV, CPPH, V, MCPPH, VI, with and without methacrylic acid.
Figure 9:
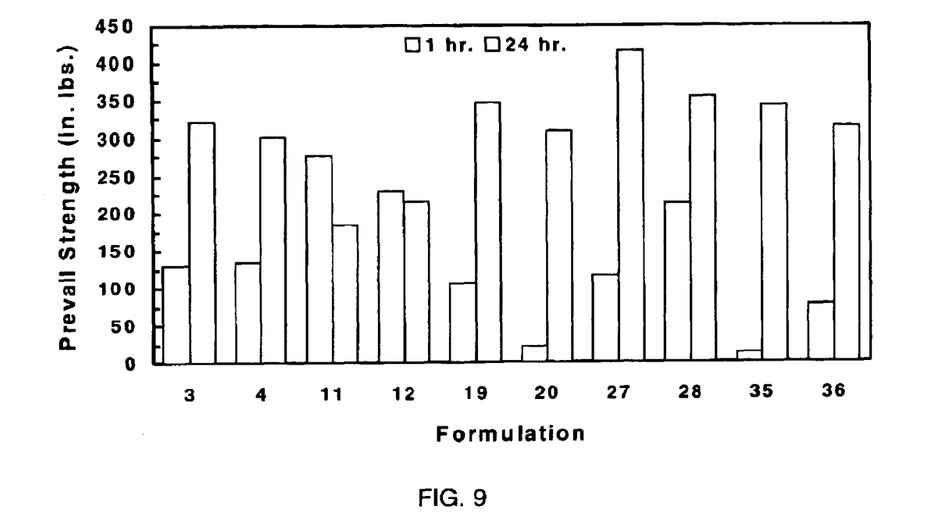
FIG. 9 depicts a bar chart of one-hour and 24 hour prevail strengths of DE-p-T/DM-o-T formulations of APH based formulations containing CAPH, III, MCAPH, IV, CPPH, V, MCPPH, VI, with and without methacrylic acid.

The results obtained from the formulations with DM-o-T/DE-p-T and CCPH or MCCPH with APH as a control, are depicted in FIGS. 8 and 9.

TABLE 6a

Data for the Controls

| Physical Property | Sample No. | | | |
|---|---|---|---|---|
|  | 1 | 2 | 3 | 4 |
| Fixture Time (min.) | 30 | 34 | 29 | 20 |
| Break Strength 1 hr. (in. lbs.) | 86 | 36 | 80 | 89 |
| Break Strength 24 hrs. (in. lbs.) | 137 | 141 | 186 | 149 |
| Prevail Strength 1 hr. (in. lbs.) | 235 | 5 | 131 | 135 |
| Prevail Strength 24 hrs. (in. lbs.) | 320 | 254 | 321 | 303 |

TABLE 6b1

Data for CAPH Formulations

| Physical Property | Sample No. | | | | | |
|---|---|---|---|---|---|---|
|  | 5 | 6 | 7 | 8 | 9 | 10 |
| Fixture Time (min.) | 12 | 12 | 9 | 8 | — | — |
| Break Strength 1 hr. (in. lbs.) | 105 | 64 | 101 | 71 | — | — |
| Break Strength 24 hrs. (in. lbs.) | 131 | 61 | 66 | 67 | — | — |
| Prevail Strength 1 hr. (in. lbs.) | 258 | 261 | 174 | 295 | — | — |
| Prevail Strength 24 hrs. (in. lbs.) | 342 | 273 | 140 | 274 | — | — |

TABLE 6b2

Data for MCAPH Formulations

| Physical Property | Sample No. | | | | | |
|---|---|---|---|---|---|---|
|  | 13 | 14 | 15 | 16 | 17 | 18 |
| Fixture Time (min.) | 150 | 215 | 141 | 224 | 180 | 210 |
| Break Strength 1 hr. (in. lbs.) | 0 | 0 | 0 | 0 | 0 | 0 |
| Break Strength 24 hrs. (in. lbs.) | 75 | 81 | 65 | 80 | 62 | 74 |
| Prevail Strength 1 hr. (in. lbs.) | 0 | 0 | 0 | 0 | 0 | 0 |
| Prevail Strength 24 hrs. (in. lbs.) | 128 | 153 | 154 | 159 | 140 | 165 |

TABLE 6b3

Data for CPPH Formulations

| Physical Property | Sample No. | | | | | |
|---|---|---|---|---|---|---|
| | 21 | 22 | 23 | 24 | 25 | 26 |
| Fixture Time (min.) | 17 | 17 | 27 | 19 | 16 | 16 |
| Break Strength 1 hr. (in. lbs.) | 59 | 68 | 71 | 55 | 54 | 67 |
| Break Strength 24 hrs. (in. lbs.) | 95 | 88 | 90 | 84 | 115 | 99 |
| Prevail Strength 1 hr. (in. lbs.) | 318 | 290 | 265 | 288 | 248 | 351 |
| Prevail Strength 24 hrs. (in. lbs.) | 364 | 336 | 309 | 278 | 351 | 358 |

TABLE 6b4

Data for MCPPH Formulations

| Physical Property | Sample No. | | | | | |
|---|---|---|---|---|---|---|
| | 29 | 30 | 31 | 32 | 33 | 34 |
| Fixture Time (min.) | 120 | 45 | 76 | 35 | 84 | 35 |
| Break Strength 1 hr. (in. lbs.) | 42 | 67 | 25 | 71 | 22 | 56 |
| Break Strength 24 hrs. (in. lbs.) | 96 | 117 | 83 | 117 | 142 | 11 |
| Prevail Strength 1 hr. (in. lbs.) | 82 | 180 | 16 | 240 | 3 | 16 |
| Prevail Strength 24 hrs. (in. lbs.) | 323 | 305 | 239 | 358 | 393 | 40 |

TABLE 6c1

Data for CAPH and MCAPH Formulations with DE-p-T/DM-o-T/Maleic Acid

| Physical Property | Sample No. | | | | | |
|---|---|---|---|---|---|---|
| | 3 | 4 | 11 | 12 | 19 | 20 |
| Fixture Time (min.) | 29 | 20 | 9 | 9 | 21 | 39 |
| Break Strength 1 hr. (in. lbs.) | 80 | 89 | 102 | 112 | 49 | 37 |
| Break Strength 24 hrs. (in. lbs.) | 186 | 149 | 50 | 61 | 103 | 113 |
| Prevail Strength 1 hr. (in. lbs.) | 131 | 135 | 276 | 229 | 108 | 23 |
| Prevail Strength 24 hrs. (in. lbs.) | 321 | 303 | 185 | 217 | 347 | 309 |

TABLE 6c2

Data for CPPH and MCPPH Formulations with DE-p-T/DM-o-T/Maleic Acid

| Physical Property | Sample No. | | | |
|---|---|---|---|---|
| | 27 | 28 | 35 | 36 |
| Fixture Time (min.) | 22 | 20 | 55 | 33 |
| Break Strength 1 hr. (in. lbs.) | 58 | 43 | 38 | 48 |
| Break Strength 24 hrs. (in. lbs.) | 132 | 147 | 122 | 111 |
| Prevail Strength 1 hr. (in. lbs.) | 117 | 213 | 13 | 79 |
| Prevail Strength 24 hrs. (in. lbs.) | 416 | 355 | 342 | 317 |

Data for Sample Nos. 1–36 in terms of fixture time, break strength and prevail strength are shown in Tables 6a (Conrols), 6b (CAPH, MCAPH, CPPH and MCPPH, without maleic acid) and 6c (CAPH, MCAPH, CPPH and MCPPH, with DE-p-T/DM-o-T/MA). These data indicate that the formulations in accordance with this invention functioned at room temperature like traditional anaerobic (meth)acrylate-based adhesives when applied and cured on the substrates.

While the present invention has been described herein by way of illustration and examples, it will be clear to those persons of skill in the art that changes and modifications may be made from the specific description without departing from the spirit and scope of the present invention defined by claims which follow hereinafter.

What is claimed is:

1. An anaerobic curable composition, comprising:
   (a) a (meth)acrylate component;
   (b) an anaerobic cure-inducing composition and
   (c) an anaerobic cure accelerator compound having the linkage —C(=O)—NH—NH— and an organic acid group on the same molecule, provided the anaerobic cure accelerator compound excludes 1-(2-carboxyacryloyl)-2-phenylhydrazine wherein the anaerobic curable composition is substantially free of acetyl phenyl hydrazine and maleic acid.

2. The composition according to claim 1, wherein the anaerobic cure accelerator is a member selected from the group consisting of:

wherein $R^1$–$R^7$ are each independently selected from hydrogen and $C_{1-4}$; Z is a carbon-carbon single bond or carbon-carbon double bond; q is 0 or 1; and p is an integer between 1 and 5.

3. The composition according to claim 1, wherein the (meth)acrylate component is represented by $H_2C=CGCO_2R^8$, wherein G is a member selected from the group consisting of H, halogen and alkyl having from 1 to about four carbon atoms, and $R^8$ is a member selected from the group consisting of alkyl, cycloalkyl, aklenyl, cycloalkenyl, alkaryl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulonate and sulfone.

4. The composition according to claim 1, wherein the (meth)acrylate component is a member selected from the group consisting of silicone (meth)acrylates, polyethylene glycol di(meth)acrylates, tetrahydrofuran (meth)acrylates and di(meth)acrylates, hydroxypropyl (meth)acrylate, hexanediol di(meth)acrylate, trimethylol propane tri(meth) acrylates, diethylene glycol di(meth)acrylates, triethylene glycol di(meth)acrylates, tetraethylene diglycol di(meth) acrylates, diglycerol tetra(meth)acrylates, tetramethylene di(meth)acrylates, ethylene di(meth)acrylates, neopentyl glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, and bisphenol-A di(meth)acrylates, ethoxylated bisphenol-A-di(meth)acrylates, bisphenol-F-di(meth)acrylates, and ethoxylated bisphenol-F-di(meth)acrylates.

5. The composition according to claim 1, wherein the anaerobic cure accelerator is within the following structure:

wherein $R^1$–$R^3$ and p are as defined in claim 1.

6. The composition according to claim 1, wherein the anaerobic cure accelerator is selected from the group consisting of

IV

V

VI

7. The composition according to claim 1, further comprising the combination of diethyl-p-toluidine and dimethyl-o-toluidine.

8. Reaction products of the composition according to claim 1.

9. A process for preparing a reaction product from an anaerobic curable composition, comprising the steps of:
apply an anaerobic curable composition according to claim 1, to a desired substrate surface; and
exposing the composition to an anaerobic environment for a time sufficient to cure the composition.

10. A method of preparing an anaerobic curable composition, comprising the step of:
mixing together:
a (meth)acrylate component,
an anaerobic cure inducing composition
an anaerobic cure accelerator compound, having the linkage —C(=O)—NH—NH— and an organic acid group on the same molecule and excludes 1-(2-carboxyacryloyl)-2-phenylhydrazine, wherein the anaerobic curable composition is substantially free of acetyl phenyl hydrazine and maleic acid.

11. The composition according to claim 1, wherein the anaerobic cure-inducing composition comprises the combination of a free radical initiator and a free radical co-accelerator.

12. A method of using an anaerobic cure accelerator compound, having the linkage —C(=O)—NH—NH— and an organic acid group on the same molecule, comprising either:
(I) mixing the anaerobic cure accelerator compound having the linkage —C(=O)—NH—NH— and an organic acid group on the same molecule and excludes 1-(2-carboxyacryloyl)-2-phenylhydrazine in an anaerobic curable composition; or
(II) applying onto a surface of a substrate the anaerobic cure accelerator compound having the linkage —C(=O)—NH—NH— and an organic acid group on the same molecule and applying thereover an anaerobic curable composition wherein the anaerobic curable composition is substantially free of acetyl phenyl hydrazine and maleic acid.

13. An anaerobic curable composition, consisting essentially of:
(a) a (meth)acrylate component;
(b) an anaerobic cure-inducing composition; and
(c) an anaerobic cure accelerator compound, having the linkage —C(=O)—NH—NH— and an organic acid group on the same molecule and excludes 1-(2-carboxyacryloyl)-2-phenylhydrazine; and
(d) optionally, one or more additives selected from the group consisting of free radical initiators, free radical co-accelerators, free radical inhibitors, metal catalysts, thickneners, non-reactive plasticizers, fillers, and toughening agents.

14. The composition of claim 13, wherein the anaerobic cure accelerator is a member selected from the group consisting of:

wherein $R^1$–$R^7$ are each independently selected from hydrogen and $C_{1-4}$; Z is a carbon-carbon single bond or carbon-carbon double bond; q is 0 or 1; and p is an integer between 1 and 5.

15. A bond formed between two mated substrates with the composition of claim 1.

16. An anaerobic curable composition, comprising:

(b) a (meth)acrylate component;

(b) an anaerobic cure-inducing composition and (c) an anaerobic cure accelerator compound having the linkage —C(=O)—NH—NH— and an organic acid group on the same molecule and excludes 1-(2-carboxyacryloyl)-2-phenylhydrazine, wherein the anaerobic curable composition is substantially free of acetyl phenyl hydrazine and maleic acid, provided the composition is not rendered UV curable by the addition of a UV photoinitiator.

17. The composition according to claim 16, wherein the anaerobic cure accelerator is selected from the group consisting of

III

IV

V

VI

\* \* \* \* \*